(12) United States Patent
Miller et al.

(10) Patent No.: US 10,288,394 B2
(45) Date of Patent: May 14, 2019

(54) WARHEAD FRAGMENTING STRUCTURE OF COMPACTED FRAGMENTS

(71) Applicant: Textron Innovations Inc., Providence, RI (US)

(72) Inventors: Clayton W. Miller, Reading, MA (US); James A. Hollowell, North Andover, MA (US)

(73) Assignee: Textron Innovations Inc., Providence, RI (US)

( * ) Notice: Subject to any disclaimer, the term of this patent is extended or adjusted under 35 U.S.C. 154(b) by 221 days.

(21) Appl. No.: 15/205,113

(22) Filed: Jul. 8, 2016

(65) Prior Publication Data
US 2018/0112960 A1  Apr. 26, 2018

Related U.S. Application Data

(60) Provisional application No. 62/190,463, filed on Jul. 9, 2015.

(51) Int. Cl.
*B32B 9/04* (2006.01)
*B21K 21/06* (2006.01)
(Continued)

(52) U.S. Cl.
CPC ............. *F42B 12/32* (2013.01); *F42B 12/24* (2013.01); *F42B 33/00* (2013.01); *B21K 21/06* (2013.01);
(Continued)

(58) Field of Classification Search
CPC ............. F42B 12/32; Y10T 428/12063; Y10T 428/12069; Y10T 428/12076;
(Continued)

(56) References Cited

U.S. PATENT DOCUMENTS 4,032,335 A * 6/1977 Zapf ...................... F42B 12/32
                                                     419/6
4,292,829 A * 10/1981 Weber .................... B22F 7/064
                                                    102/492
(Continued)

FOREIGN PATENT DOCUMENTS

DE      1943472 A1     3/1971
GB      1318966        5/1973
(Continued)

*Primary Examiner* — Carson Gross
(74) *Attorney, Agent, or Firm* — BainwoodHuang

(57) ABSTRACT

A method of making a fragmenting structure for an explosive device includes placing a volume of fragments of a deformable metal material into a press mold, the fragments having sufficient surface adhesiveness to adhere to each other upon being compressed together, e.g., by coating the fragments with adhesive. The fragments are compressed together in the press mold to form the fragmenting structure as a rigid and substantially void-free structure of compression-deformed, mutually adhering metal fragments, the fragmenting structure being sized and shaped for subsequent incorporation into the explosive device. An explosive device includes an explosive charge and a fragmenting structure adjacent to the explosive charge, the fragmenting structure being a rigid and substantially void-free structure of compression-deformed, mutually adhering metal fragments. The structure may have been manufactured by the disclosed method.

11 Claims, 5 Drawing Sheets

(51) Int. Cl.
  *B32B 15/04*   (2006.01)
  *F42B 12/24*   (2006.01)
  *F42B 12/32*   (2006.01)
  *F42B 33/00*   (2006.01)

(52) U.S. Cl.
  CPC ............ *B32B 9/041* (2013.01); *B32B 15/043* (2013.01); *Y10T 428/1209* (2015.01)

(58) Field of Classification Search
  CPC ....... Y10T 428/12083; Y10T 428/1209; B32B 9/041; B32B 15/00; B32B 15/04; B32B 15/043; B21K 21/06
  See application file for complete search history.

(56) References Cited

U.S. PATENT DOCUMENTS

| | | | | |
|---|---|---|---|---|
| 4,296,180 | A * | 10/1981 | Rhau | B21K 21/06 |
| | | | | 102/474 |
| 4,362,563 | A * | 12/1982 | Stadler | B22F 7/064 |
| | | | | 102/491 |
| 4,982,668 | A * | 1/1991 | Bender | F42B 12/32 |
| | | | | 102/495 |
| 8,176,849 | B1 * | 5/2012 | Gold | F42B 12/32 |
| | | | | 102/491 |
| 9,708,227 | B2 * | 7/2017 | Alven | F42B 12/44 |
| 2014/0020590 | A1 * | 1/2014 | Torsten | F42B 33/00 |
| | | | | 102/495 |

FOREIGN PATENT DOCUMENTS

| | | | |
|---|---|---|---|
| WO | 2014098836 | A1 | 6/2014 |
| WO | 2014149845 | A1 | 9/2014 |

* cited by examiner

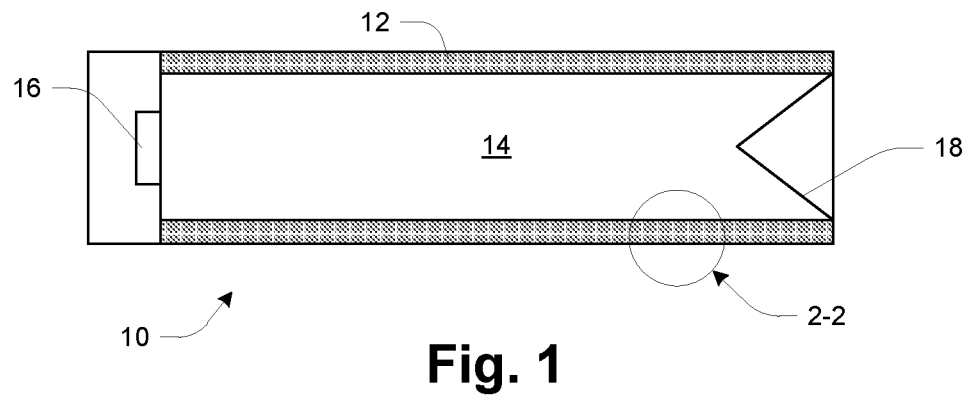
Fig. 1
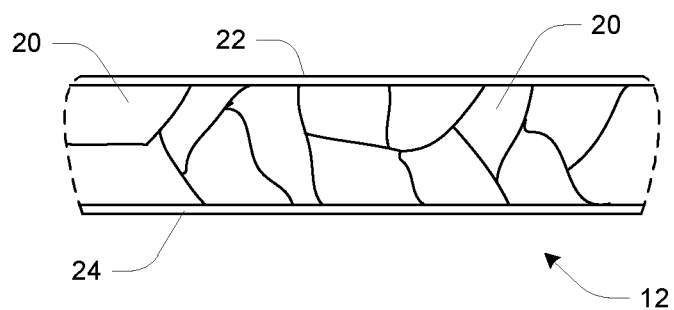
Fig. 2
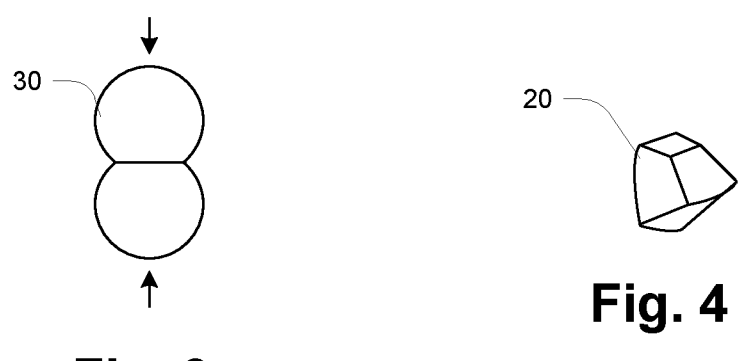
Fig. 3
Fig. 4

WARHEAD FRAGMENTING STRUCTURE OF COMPACTED FRAGMENTS

BACKGROUND

The invention is related to the field of exploding ordnance including warheads.

SUMMARY

A typical warhead may have a casing formed of a unitary, integral body (e.g., a steel cone or cylinder) that naturally fractures into fragments upon detonation of an explosive charge of the warhead. A naturally fragmenting (e.g., steel cased) warhead produces a spectrum of fragment sizes depending on the steel properties and the associated fracture statistics (e.g., so-called Mott distribution).

Other warheads may have a casing or liner formed as an assemblage of fragments rather than as a unitary body. Such pre-formed fragment warheads may be made with fragments having desired individual fragment shapes and masses. In some cases the fragments may all have the same shape and mass, while in other cases it may be desired to include multiple different sizes and masses for desired effects.

One challenge with pre-formed fragment warheads is to achieve desirably high packing density of the fragments. Generally, packing densities for randomly-placed fragments in a large convex volume are on the order of 0.64 for ball-shaped fragments, and 0.78 for cube-shaped fragments. While packing densities can be increased using a more ordered placement process in manufacturing (e.g., hand placement), such processing increases cost. Random packing is desirable for low cost manufacture. As an example, a collection of fragments may simply be dumped into an enveloping structure, which is a generally low cost process.

In one example, a warhead uses several hundred (e.g., 900) pre-formed 0.9 gm steel ball fragments held together in a polyurethane matrix. The packing density is likely well less than 1.0, e.g., in the range of 0.5-0.9, and the polyurethane-filled voids provide escape channels for gases generated at detonation, so that less energy is transferred to the fragments than would be in the absence of such escape channels. Fragment velocity is thus less than it might be, limiting the effectiveness of the warhead accordingly. As a further example, the average fragment velocity for a unitary-body warhead might be approximately 1500 meters per second, while the average fragment velocity for such a steel-ball warhead might be approximately 1200 meters per second, 20% lower.

Another approach to warhead design is to use unitary structures that have been etched in some manner to form fragments that are still joined together by a remaining non-etched part of the structure. In one example, a cylindrical structure may be formed by a stack of rings having their outer surfaces deeply etched to define such fragmenting portions. These warheads may provide better performance due to the absence of escape channels, but the etching and related processing causes the manufacturing costs to be high.

It would be desirable to have a pre-formed fragmenting warhead that has higher effectiveness than current pre-formed fragmenting warheads, e.g., higher fragment velocity due to absence of escape channels, while also being simple and low-cost to manufacture.

In a disclosed technique, pre-formed metal fragments are random-packaged and then compacted together to remove void space. The fragments are made of a ductile metal that deforms under the applied pressure, causing the fragments to better conform to each other and reduce/remove void space. This can provide packing density approaching 100%, and thus higher fragment launch velocity due to the absence of gaps between fragments.

The fragments are preferably bonded to each other so that a resulting structure is rigid and strong for subsequent handling (e.g., incorporating into warhead assembly). Bonding may be provided by coating the fragments with thin adhesive before compaction.

Another aspect is to manage so-called "L/D", which is ratio of maximum fragment diameter/minimum fragment diameter. Ideally L/D is very close to 1, and an ordnance definition of a compact fragment is L/D<1.5. Thus, compacting is preferably done in a way that achieves desired L/D~1.0 of the compressed fragments, beginning with the randomly packed fragments.

In one aspect, a method is disclosed of making a fragmenting structure for an explosive device. The method includes placing a volume of fragments of a deformable metal material into a press mold, the fragments having sufficient surface adhesiveness to adhere to each other upon being compressed together. The method further includes compressing the fragments together in the press mold to form the fragmenting structure as a rigid and substantially void-free structure of compression-deformed, mutually adhering metal fragments, the fragmenting structure being sized and shaped for subsequent incorporation into the explosive device.

In another aspect, an explosive device is disclosed that includes an explosive charge and a fragmenting structure adjacent to the explosive charge, the fragmenting structure being a rigid and substantially void-free structure of compression-deformed, mutually adhering metal fragments. The structure may have been manufactured by the disclosed method, for example.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 1 is a schematic sectional view of a cylindrical explosive device, also referred to as a warhead;

FIG. 2 is a close-up schematic view of a section of a fragmenting structure;

FIG. 3 is a schematic depiction of compressive deformation of spherical fragments;

FIG. 4 is a perspective view of a compressively deformed fragment;

DETAILED DESCRIPTION

Figure 5:
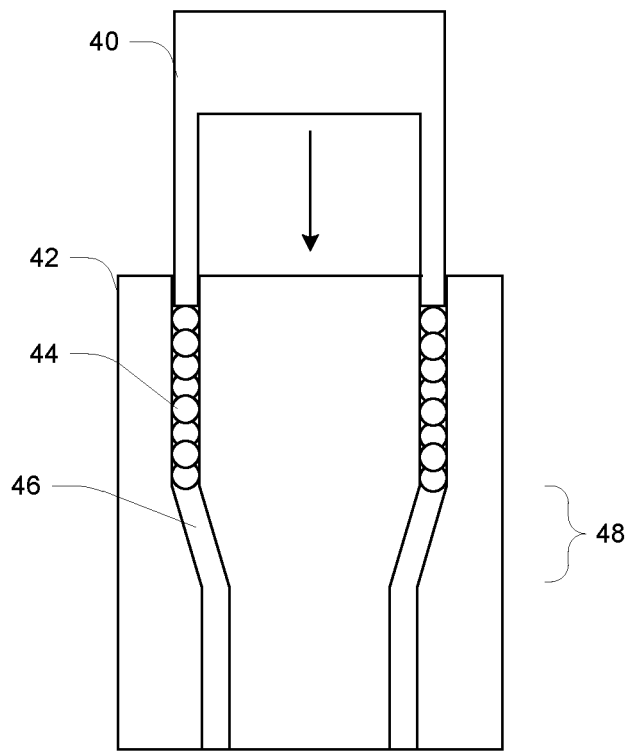
FIGS. 5-8 show a punch and die press mold and its use in making a cylindrical fragmenting structure.

Briefly recapping, pre-formed fragment warheads have the advantage of being able to launch a number of metallic fragments having desired individual fragment masses. Existing pre-formed fragment warheads have some drawbacks compared to naturally fragmenting warheads having the same size, mass and charge-to-mass ratio. Launch velocity for the pre-formed fragment warhead is less on average than for the naturally-fragmenting warhead because of explosive gas blow-by. Some of the mass launched by the pre-formed fragment warhead is parasitic, because matrix material (e.g., polyurethane) is used to encapsulate the pre-formed fragments. Therefore less actual metallic fragment mass is produced by the pre-formed fragment warhead and the fragments have lower launch velocity for the same mass warhead.

An advanced fragmenting warhead is disclosed that uses pre-formed metal fragments and a void reduction technique to produce mass-efficient fragment packaging which achieves higher launch velocity by reducing explosive gas blow-by during explosive launch. Individual fragment mass is controlled, so that all fragments can have the same mass if so designed. A larger number of higher velocity fragments can be produced from the same mass warhead compared to a standard pre-formed warhead. Alternatively, the same number, mass and velocity fragments can be produced by a lighter-weight warhead. The technique may also achieve desired low production cost of the fragmenting warhead liners.

The approach to remove much of the void volume between the pre-formed fragments is by compressing an appropriate number of fragments together under high pressure, e.g., using a punch and die set. The compression causes the fragments to deform so as to better conform to each other, reducing voids. The pre-formed fragments may be coated with a thin layer of adhesive, then the coated fragments are poured into a lubricated die. The punch at the appropriate load (tonnage or PSI) then compacts the assemblage of fragments into a final shape which conforms to the shape of the die. After curing of the adhesive the warhead liner is removed from the die set. For example an annular punch and die set can be used to form a hollow cylindrical structure which serves as the external housing for a central, cylindrical explosive charge. Other warhead liner shapes are possible as well. Upon explosive detonation, the fragments will be launched at high velocity and will separate from one another. The fragments will have the same mass as before compaction and be quite compact, but they may have a variety of shapes depending upon their locations in the die during compression.

It should be understood that the individual fragments are "compressed" in the sense of "experiencing a compressive force." The fragments are generally of metal and thus incompressible in the sense of experiencing volume reduction. Being of a ductile/malleable material, however, the fragments do react to compressive forces by deforming in shape, such as explained herein.

The disclosed warhead liner fabrication approach may perform better than the standard pre-formed fragment warhead. The removal of the void space, for example, also removes the "escape channels" or open paths by which the explosive gases can escape between the fragments, providing more impulse to the fragments during explosive launch. No significant matrix material is required and no matrix material is launched along with the fragments as happens in a standard pre-formed fragment warhead. With the void volume removed the compacted pre-formed fragments have higher velocity than in the standard pre-formed warhead approach, and more fragments can be incorporated into the same fragmenting liner volume.

FIG. 1 shows a cylindrical explosive device or "warhead" 10 in axial cross section. Major components include a cylindrical fragmenting structure 12 surrounding explosive fill 14, with a detonator 16 at one end and a V-shaped cap 18 at the other end. In this configuration the V-shaped cap 18 and explosive fill 14 define a shaped charge. In alternative embodiments the V-shaped cap 18 may be replaced with an element having somewhat flatter structure forming an explosively formed penetrator (EFP).

FIG. 2 illustrates the fragmenting structure 12. It is composed of metal fragments 20 whose shapes result from high-pressure compression as described below. The fragmenting structure 12 may be disposed between thin inner and outer liners 22, 24. The fragments 20 are preferably of a ductile/malleable metal, including for example tantalum and copper. Under sufficient compression, the fragments 20 deform into essentially random polyhedral shapes, conforming to each other and filling any voids that might exist prior to compression. As an example, the fragments 20 may initially all have spherical shapes, creating corresponding voids in a packed collection. Under sufficient compression, the fragments 20 deform to substantially remove the voids. The fragments 20 may be coated with an adhesive prior to compression, so that upon curing they adhere to each other and form a substantially solid structure.

In operation, the warhead 10 of FIG. 1 is detonated by activation of the detonator 16 in conventional fashion. Pressure from explosion of the explosive fill 14 causes the fragmenting structure 12 to break apart. Given the pre-fragmentation of this structure, i.e., its construction from fragments 20 with relatively weak surface bonding therebetween, the fragmenting structure 12 naturally breaks apart into the fragments 20, i.e., separated from each other and being thrust radially outwardly away from the axis of the warhead 12. The fragments 20 are of controlled size(s) which can be tailored to inflict desired damage on targets, potentially more effective than other types of fragmenting structures such as unitary casings/liners etc. Also, because of the essentially void-free characteristic of the fragmenting structure 12, there is efficient transfer of kinetic energy from the explosive gases to the fragments 20, imparting a higher average velocity/energy than alternative structures that contain inter-fragment voids (e.g., in structures of packed spherical balls for example) that permit escape of explosive gases and thus reduce average energy transfer.

FIG. 3 illustrates compression-induced deformation of spherical balls 30 of ductile/malleable metal material. In this simplified example the balls 30 are compressed together along the line separating their centers, resulting in a flattening of both balls 30 where they meet. Such compression creates point to point contact initially, but as deformation progresses the balls flatten against each other in the original plane perpendicular to the axis through their centers and containing the initial point of contact.

FIG. 4 illustrates an individual fragment 20. As shown, it has a generally polyhedral solid shape, with flattened surface areas where it has been compressed against adjacent fragments 20. Generally, a fragment 20 may start out having any of a variety of shapes, such as spherical, cubic, etc. As explained above, upon compression the fragments deform into respective final shapes that may resemble that of FIG. 4. One aspect of fragment shape is the so-called "L/D ratio", which is the ratio of the maximum fragment diameter/minimum fragment diameter. For ordnance it is generally desired that L/D be less than about 1.5. The chunky fragment 20 of FIG. 4 may be within this limit. It may be the case that starting with cubic pre-formed fragments rather than spherical would produce desirably chunkier deformed fragments 20, because less volumetric void space needs to be removed so less average deformation is required.

Returning to FIG. 2, the fragmenting structure 12 will generally be made using a press mold and pressing operation. The fragments 20 in their initial shapes are poured or otherwise placed into the mold, then sufficiently high pressure is applied to compress the collection of fragments 20 into the final, relatively void-free fragmenting structure 12. One specific example of such a technique is described below. Those skilled in the art will appreciate that the structure 12 can be made using other techniques.

As noted above, compressing fragments axially in a die results in shortening their axial dimension, which can undesirably increase L/D if the original fragments have a spherical or similar compact shape. A technique is described below that may be used to produce fragments with an L/D~1. In this example, a converging die and an annular punch are used. The fragments are forced into a reduced-radius cylinder, e.g., having a radius about 20% less than the radius of an upper part of the die. This compression into a reduced-radius cylinder causes radial or "hoop" compression of the fragments. Because the fragment material is essentially incompressible, the hoop compression causes an axial lengthening of the fragments, restoring L/D~1.

FIGS. 5-8 illustrate a method of making a fragmenting structure 12 using a punch 40 and die 42. This example uses spherical metal balls 44 as starting material for the fragments 20.

Figure 6:
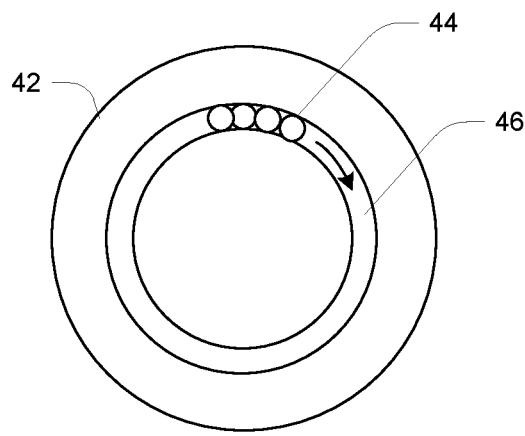

FIG. 5 shows an axial cross-sectional view, and FIG. 6 shows a top view of the die 42 alone. As shown, the die 42 has a cylindrical channel 46 formed therein, with a converging section 48 leading between an upper section of a given radius and a lower section having a lower radius. In operation, the balls 44 are placed in the upper section and the punch 40 is pressed downwardly to compress the balls 44 together.

Figure 7:
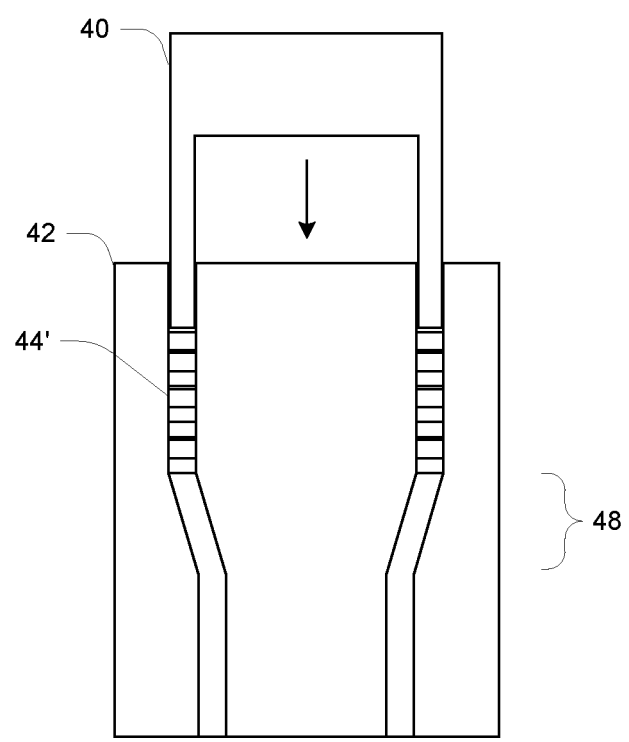

FIG. 7 shows an intermediate condition in which the balls 44' have been deformed under the compression to generally rectangular shapes, i.e., having axial-direction lengths less than their radial-direction lengths/widths. Thus, the L/D ratios of the compressed balls 44' may be greater than desired.

Figure 8:
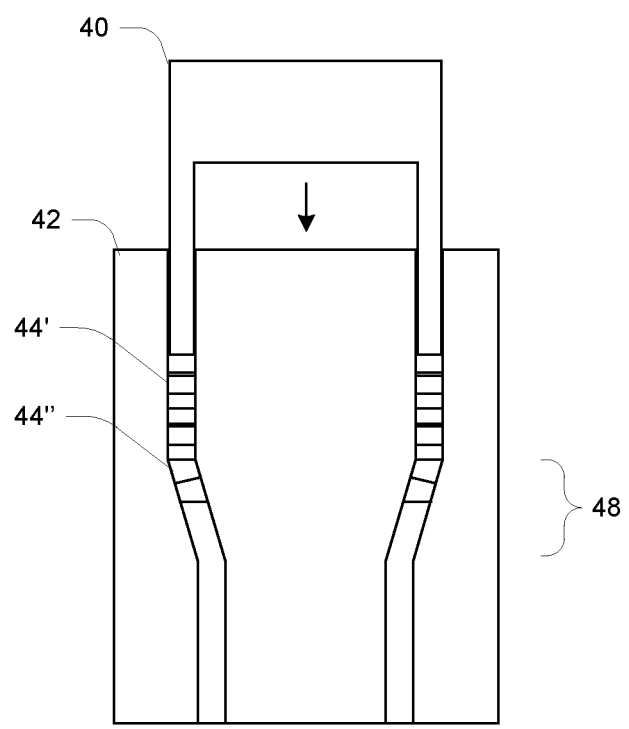

FIG. 8 shows a later condition in which some of the compressed balls, indicated at 44", have been forced in to the converging section 48. Being forced to the smaller-radius region, the incompressible balls 44" experience a hoop stress that further deforms them, in this case causing them to lengthen slightly in the axial direction, thus tending to reduce L/D to a value closer to 1. Thus, the arrangement of FIGS. 5-8 can produce the fragmenting structure 12 with fragments 20 having acceptable L/D ratios for use in a fragmenting warhead.

Figure 9:
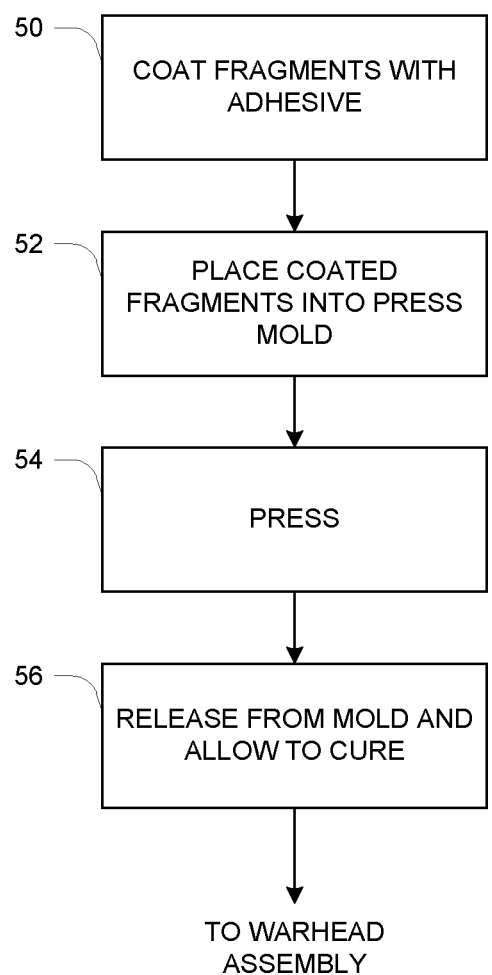
FIG. 9 is a flow diagram of a method of making a fragmenting structure for a warhead.

FIG. 9 is a high-level flow diagram of the method of making the fragmenting structure 12. At 50, the starting fragments are coated with an adhesive to promote mutual bonding for creating a unitary structure, as described above. The starting fragments may have any of a variety of shapes, such as spherical, cubic, etc. They may be of uniform size or there may be a desired mixture or distribution of multiple sizes.

At 52, the coated fragments are placed into a press mold, preferably packed together to minimize the initial void space.

At 54, the collection of fragments is pressed in the press mold. This pressing should be of sufficient magnitude and duration to bring about the desired deformation of the fragments that substantially removes the voids, as described above. As an example, the compression may be on the order of 10,000 PSI or higher.

At 56, the resulting structure is removed from the mold, and the adhesive allowed to cure. The result is a rigid and mechanically robust fragmenting structure, such as the structure 12 described above. This structure is then incorporated into the warhead assembly to produce the final warhead or explosive device.

Although the above shows fragments of equal original size, mixed-size fragments might be incorporated into a single pressing operation, i.e., first mixed together then pressed to make the liner.

Potential Uses

The disclosed technique for making a fragmenting structure may be used in the following example applications:

Ballistic warheads with fragmenting liners of various geometries—cylindrical, disk-shaped, hemispherical or ogive, etc.

Anti-vehicle and anti-personnel mines

Encased bombs, e.g., 500 lb. bombs

While various embodiments of the invention have been particularly shown and described, it will be understood by those skilled in the art that various changes in form and details may be made therein without departing from the spirit and scope of the invention as defined by the appended claims.

What is claimed is:

1. A method of making a fragmenting structure for an explosive device, comprising:
   placing a volume of fragments of a deformable metal material into a press mold, the fragments having sufficient surface adhesiveness to adhere to each other upon being compressed together; and
   compressing the fragments together in the press mold to form the fragmenting structure as a rigid and substantially void-free structure of compression-deformed, mutually adhering metal fragments, the fragmenting structure being sized and shaped for subsequent incorporation into the explosive device.

2. The method of claim 1, wherein the press mold is a converging press mold having a reduced-radius section, and wherein compressing the fragments together includes pushing compressed fragments into the reduced-radius section, inducing a hoop stress causing the compressed fragments to lengthen.

3. The method of claim 1, further including (1) prior to placing the volume of fragments into the press mold, coating the fragments with a thin layer of adhesive to cause the fragments to adhere to each other, and (2) after compressing the fragments together, allowing the adhesive to cure.

4. The method of claim 1, wherein the fragments have respective L/D ratios less than 1.5, the L/D ratio for a fragment being a ratio of maximum fragment diameter to minimum fragment diameter.

5. The method of claim 1, wherein the fragmenting structure has one layer of the metal fragments.

6. The method of claim 1, wherein the fragmenting structure has multiple layers of the metal fragments.

7. The method of claim 6, wherein compressing the fragments deforms the fragments into have generally polyhedral shapes with faces abutting faces of neighboring fragments in the fragmenting structure.

8. The method of claim 1, wherein the fragmenting structure has a cylindrical shape corresponding to a cylindrical boundary of the an explosive fill.

9. The method of claim 1, wherein the fragments are of multiple predetermined sizes.

10. The method of claim 1, wherein the metal fragments are of a malleable metal material.

11. The method of claim 10, wherein the malleable metal material is selected from copper and tantalum.

\* \* \* \* \*